No. 713,186. Patented Nov. 11, 1902.
R. WELFORD.
SECONDARY BATTERY.
(Application filed Nov. 21, 1899.)
(No Model.) 2 Sheets—Sheet 1.
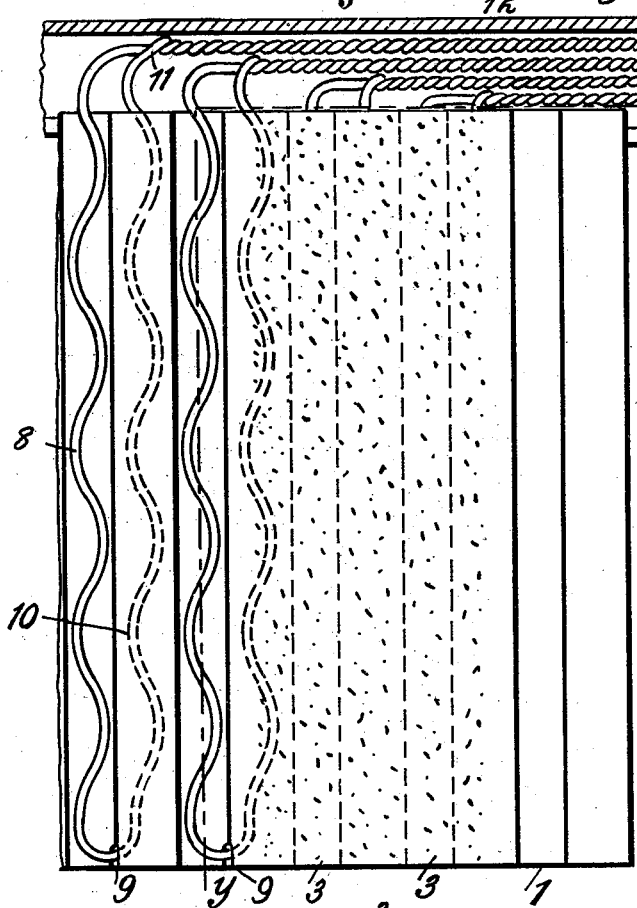
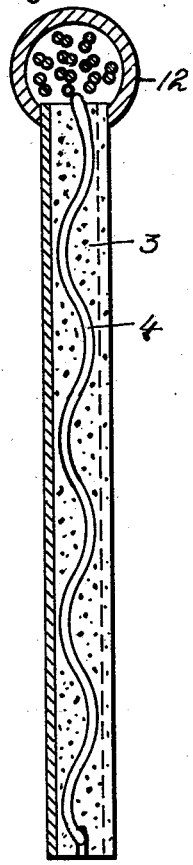
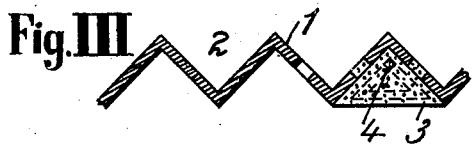
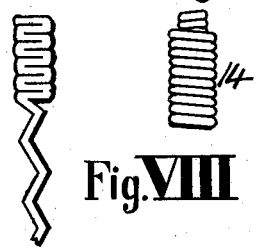
Witnesses:
Inventor:
Robert Welford,
by Attorneys No. 713,186. Patented Nov. 11, 1902.
R. WELFORD.
SECONDARY BATTERY.
(Application filed Nov. 21, 1899.)
(No Model.) 2 Sheets—Sheet 2.
Fig. IX
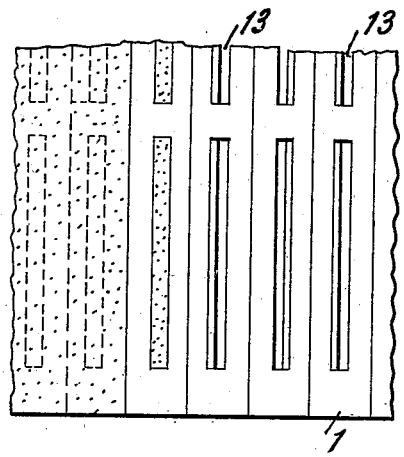
Fig. X
Fig. XI
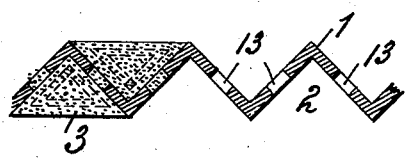
Fig. XII
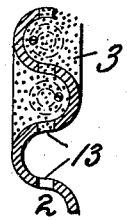
Witnesses:
Frank S. Ober
Samuel N. Chesnut
Inventor:
Robert Welford,
by Fowler & Fowler,
Attorneys

UNITED STATES PATENT OFFICE.

ROBERT WELFORD, OF SUNDERLAND, ENGLAND.

SECONDARY BATTERY.

SPECIFICATION forming part of Letters Patent No. 713,186, dated November 11, 1902.

Application filed November 21, 1899. Serial No. 737,760. (No model.)

*To all whom it may concern:*

Be it known that I, ROBERT WELFORD, a subject of the Queen of Great Britain, and a resident of Sunderland, in the county of Durham, England, have invented certain new and useful Improvements in Secondary Batteries, of which the following is a specification.

My invention relates to secondary batteries by means of which certain advantages are obtained, notably light weight and large exposure of active surface.

My invention is applicable not only to batteries of what may be termed the "Planté" type, but also those of what may be termed the "Faure" type—that is to say, it is applicable to batteries in which metallic lead is "formed" by the action of the electric current, as well as to those in which a lead-paste is applied to the conductor or conductors.

I shall first describe my invention as applied to a battery of the Faure type. In this case I employ conducting wire or wires coiled into a helix or folded or bent and surrounded by paste in such manner that the said wires act as cores to the said paste. In other words, the said paste takes the form of rods or prisms or the like and surrounds the conductors in a manner resembling that in which the tallow surrounds the wick of a candle. Thus if we imagine a number of candles hanging from a horizontal rod we obtain a good conception of an elementary form of this invention, it being borne in mind that the tallow corresponds with the paste and that the conductor coiled or folded corresponds with the wick. For the purpose of spacing the said rods or prisms apart and keeping them in operative position I usually employ a corrugated sheet of hard rubber or other convenient insulating material; but this plate may when desired be dispensed with, particularly in the case of batteries employed for stationary purposes.

In order that my invention may be more readily understood, I have appended drawings hereto, in which—

Figure I is a diagram illustrative of my invention. Fig. I$^a$ is a vertical section on the line $y\ y$ of Fig. I. Fig. II is a cross-section showing one form of supporting-plate. Fig. III is a cross-section of a modified form. Fig. IV is a cross-section of another modification. Fig. V is a plan of a conducting-helix. Fig. VI is an elevation thereof. Fig. VII is an elevation of another form of conducting-helix. Fig. VIII is an elevation of a form of helix intended to inclose another helix. Figs. IX and X show an elevation and a cross-section, respectively, of the modified form of invention. Figs. XI and XII are cross-sectional views showing the arrangement of the transverse slots which extend through the plate.

In the drawings similar numerals of reference indicate similar or equivalent parts.

In the figures, 1 is the plate of insulating material, such as hard rubber, which is corrugated, as shown—that is to say, with curved grooves 2, as in Fig. II, with angular grooves, as in Fig. III, and with square or rectangular grooves, as in Fig. IV. Within each of the said grooves is a rod or prism 3, of oxid or paste, each rod or prism having a central core 4, consisting of a lead wire.

A convenient way of constructing such a battery is as follows: I take a length or lengths of lead wire and coil the same tightly around a mandrel, so as to get a helix, as shown in plan in Fig. V and in elevation in Fig. VI, (in the latter figure at the part 5.) I then take the said helix of wire off the mandrel and pull it out either slightly, as shown at the part 6 of Fig. VI, or extendedly, as shown at the part 7 of that figure. I now take this wire, and leaving a sufficient length extending beyond the top of the hard-rubber plate I lay it loosely in one of the grooves 2, as shown at 8. (See Fig. I.) I then pass it around through the notch 8 at the foot of the said groove and then up the continuous groove on the other surface of the plate, as shown by the dotted lines 10, Fig. I. The wires now lie in the grooves, as shown in the left-hand part of the plate illustrated in Fig. I. I now take a quantity of prepared paste and spread it over the surfaces of the plate and work it well in behind and around the lead wires, so as to form rods or prisms of which the said wires shall act as cores. I now have a number of cored rods or prisms fitting the grooves of the said plates. The free ends of the wires may be led out from the top of the plate in any convenient manner—as, for example, by twisting them together, as shown at 11, (see Fig. I,) and passing them through the slotted hard-rubber tube 12, which is fitted over the top of the plate. It will now be seen that the rods or prisms are of more or less semicircular shape in cross-section when I employ a plate of the form shown in Fig. II, of triangular cross-section when I employ such a plate as is shown in Fig. III, and of square or rectangular cross-section when I employ such a plate as is shown in Fig. IV.

In Fig. VII, I show a core which differs from that shown in Figs. I, V, and VI, in that the lead wire instead of being coiled in a helix is bent upon itself a number of times.

In a modified form of my invention I slot the plate 1, as shown to the right-hand side of Figs. II, III, and IV and also in Figs. IX to XII, where the slots 13 are shown in elevation and in cross-section. When I do this, it will be seen that the paste is worked through from one side of the plate to the other, so that a rivet effect is obtained, and the rods or prisms on one side are "keyed," so to speak, and made integral with the rods or prisms on the other side of the plate. This form of my invention is particularly applicable to cases in which the batteries are exposed to shocks or excessive jolting.

I have hereinbefore described my invention as applied to batteries of the Fauré type; but my invention is also applicable to batteries of the Planté type. In this case—that is to say, in batteries of the Planté type—instead of using paste I dispense with rods or prisms of such material altogether, and instead thereof I use an increased quantity of lead wire coiled, wound, or folded in a more compact form. Thus instead of drawing out the wire after it has been wound on the mandrel to an extended form, such as is shown at part 7 of Fig. VI, I keep it in its closely-wound form, as shown at the part 5, and it is in this form that I lay it in the grooves 2 of the plate 1. This wire thus wound and placed in position in the grooves is then formed by the electric current after the well-known Planté manner. It will be understood that when the grooves of the plate are curved, as shown in Fig. II, I prefer to wind the helix of lead wire on a circular mandrel, and when the grooves are of other form I wind them on mandrels of a form to correspond. Thus in the case of a plate such as is shown at Fig. III, I wind the wire on a triangular mandrel, and in the case of a plate, such as is shown in Fig. IV, I wind it on a mandrel of square or rectangular cross-section.

In some cases when making my battery upon the Planté type I find it convenient to place one helix or coil of lead wire within another. Thus I may take the coil 5 (shown in Fig. VI) and place it within the larger coil 14, (shown in Fig. VIII,) and I may multiply the number of coils one within another to any desired extent.

I may combine and connect up the elements of my battery and inclose them, with their electrolyte, in suitable containing cases or vessels in any of the many convenient ways known in the art.

Having thus described my invention, what I claim, and desire to secure by Letters Patent, is—

1. A battery-electrode comprising the combination of a support formed with corrugations or ribs, a set of rods or prisms of active material placed within the recesses of said corrugations and each provided with a coiled conducting-wire extending longitudinally through the same, substantially as and for the purpose set forth.

2. A secondary-battery electrode comprising the combination of a corrugated or ribbed plate provided with perforations leading from one side of the plate to the other, active material or paste filling said corrugations upon each side of the plate and extending through said perforations so that the active material upon the opposite sides of the plate is connected together by the extensions of the active material through the perforations, and conducting-wires extending longitudinally through the active material, substantially as and for the purpose set forth.

3. A secondary-battery electrode comprising the combination of a supporting-plate having corrugations extending across the same, notches formed in one edge of the plate at the ends of the corrugations, active material or paste filling said corrugations, and conducting-wires extending longitudinally through said active material, each of said wires passing through the active material in a corrugation upon one side of the plate, thence around the edge of the plate through the notch and along the other side of the plate through the active material, substantially as and for the purpose set forth.

4. A secondary-battery electrode comprising the combination of a suitable support or plate having the active material or paste placed thereon, a set of conducting-wires extending across the plate through the active material and having their ends projecting from one edge of the plate, and a slotted tube fitted over the edge of the plate or support from which the wires project and through which the wires are led, substantially as and for the purpose set forth.

In witness whereof I have hereunto set my hand in presence of two witnesses.

ROBERT WELFORD.

Witnesses:
   THOMAS HARVEY SHACKLOCK,
   ARTHUR LENORD COOK.